Patented Dec. 3, 1946

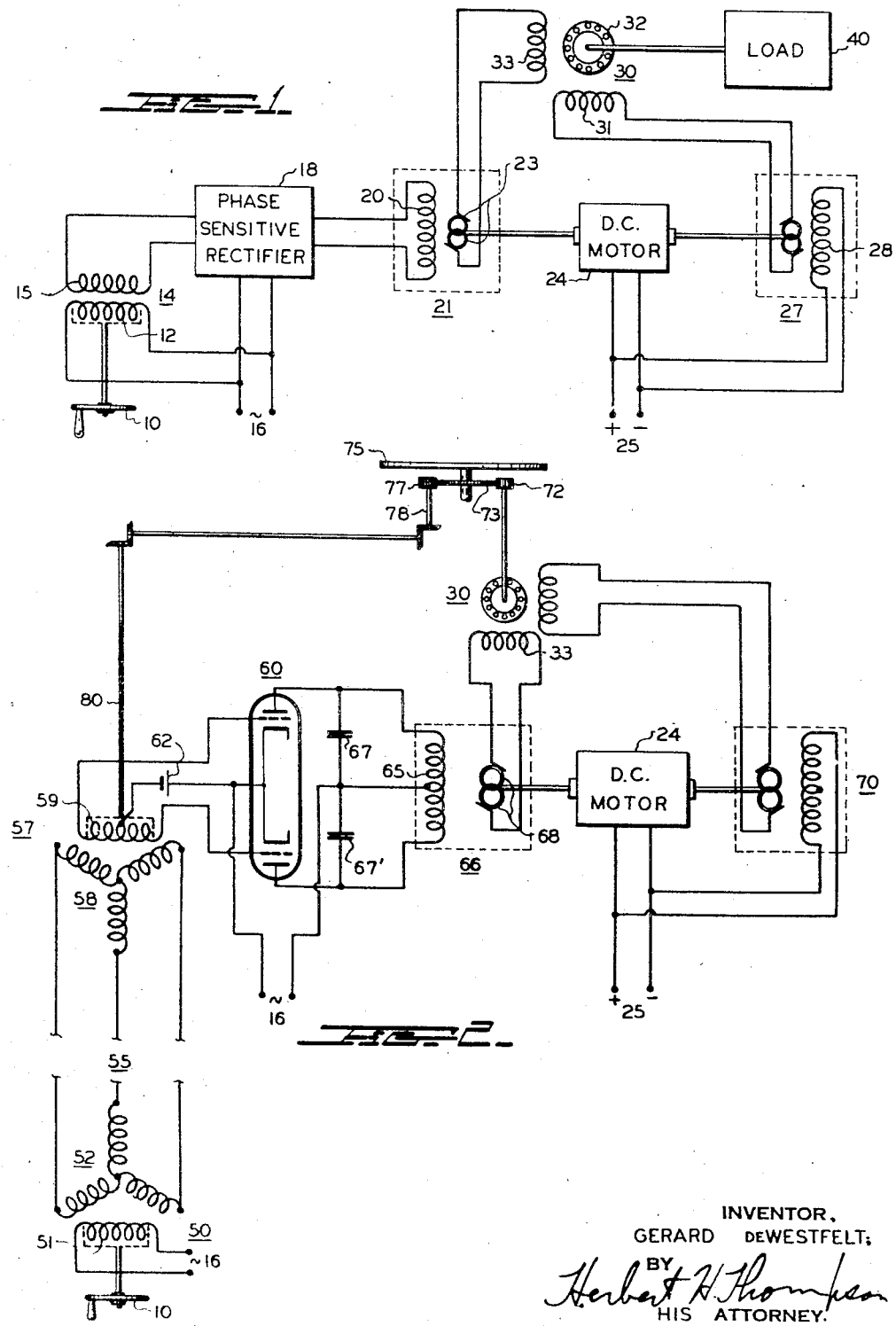

2,411,871

UNITED STATES PATENT OFFICE 2,411,871

SERVO SYSTEM

Gerard de Westfelt, New York, N. Y., assignor to Sperry Gyroscope Company, Inc., Brooklyn, N. Y., a corporation of New York Application November 2, 1942, Serial No. 464,297

5 Claims. (Cl. 172—239)

This invention relates to electrical servo systems and refers more particularly to an improved type of control for the driving means of such systems.

A servo system operates to apply a strong driving force in response to a weak controlling force or signal. The amplification of the weak signal may be brought about by a variety of known means, such as thermionic amplifiers. While the amplification ratio of a thermionic amplifier may be high such devices are not adapted in their usual forms to supply a large power output.

When higher outputs were required, certain types of rotating electrical machines have, in prior systems, been used as D. C. power amplifiers, either alone or in conjunction with thermionic means. The use of these machines has required that commutators and brushes be included in the amplifying circuit, thereby rendering the amplifier subject to the known disadvantages of commutators, including wear, sparking and variable contact resistance. These disadvantages of commutator machines are highly objectionable in amplifying apparatus, which greatly magnifies any electrical disturbance.

To overcome the disadvantages of prior systems, the present invention provides servo means comprising a power amplifier stage which has no commutators in the amplifying circuit and is adapted to furnish graduated and reversible control of rugged A. C. driving means in the form of a polyphase induction motor. Such a motor, too, avoids the disadvantages of commutators.

It is known that to control polyphase motors, for example, a two-phase motor, it is only necessary to vary or reverse one stator phase, the other phase being constantly excited. According to the invention, this control of one motor phase is exercised by the output of a single phase alternator the strength of whose field current is governed by the weak signal or a version thereof. To provide constant excitation for another or other phases of the driving motor, a second alternator is driven synchronously with the control alternator (to secure current of the same frequency) and in order to provide the necessary time phase displacement between the currents of the different motor phases the magnetic axes of the two alternators may be angularly offset, thus obviating the need for phase shifting networks.

When provided with a repeat-back from the driven object to an element controlling the output of the system, a servo system is adapted to cause the driven object to repeat the position of the controlling object, and the invention has particular application to positional control systems of this type because of the smooth and reliable operation obtained. Anti-hunting means may be included to overcome any tendency of the controlled object to overshoot the position of rest or to hunt about that position.

It is one object of the invention to provide A. C. amplifier means adapted to supply a relatively large power output.

Another object is to provide a servo or positional control system having improved driving means control.

A further object is to provide power amplification means employing rotating machines without introducing commutators into the amplifying circuit.

Other objects and advantages will become apparent from the specification, taken in connection with the accompanying drawing wherein the invention is embodied in concrete form.

In the drawing,

Fig. 1 is a wiring diagram of one form of control system, according to the invention.

Fig. 2 is a wiring diagram of a complete positional control system utilizing the improved means of the invention.

Referring particularly to Fig. 1, the controlling object is illustrated as handwheel 10, although obviously such handwheel may be replaced by any positionable member, including the movable member of a sensitive instrument. Handwheel 10 is connected to position primary 12 of transformer 14, angularly, with respect to secondary winding 15 of said transformer. Winding 12 is connected to a source of alternating potential 16. Winding 15 therefore receives an induced alternating potential proportional to the angular position of winding 12, this potential reversing in phase as the axis of winding 12 crosses a line perpendicular to the axis of winding 15.

The variable magnitude, reversible phase potential induced in winding 15 is applied to a phase-sensitive rectifier 18 which derives its phase discriminating properties from a connection to source 16. Rectifier 18 supplies, as an output, a continuous potential reversing in polarity with reversal of phase of the input to the rectifier. Such phase-sensitive rectifiers are well known in the art, one form which may be adapted for use with the arrangements of Fig. 1 being shown in Fig. 2, to be described hereinafter. The output of rectifier 18 is applied to the stationary field winding 20 of a single phase A. C. generator 21 having a rotor constantly driven by D. C. motor 24, connected to D. C. source 25.

Likewise driven by motor 24, is a second A. C. single phase generator 27 having a field 28 constantly excited from source 25. The output amplitude and phase, excites stator winding 31 of generator 27, at a substantially constant amplitude and phase, excites stator winding 31 of two-phase induction motor 30, having a squirrel cage rotor 32. The second stator phase 33 of motor 30 is excited by the output of generator 21. This latter output varies in amplitude with variation of the excitation of field winding 20 and reverses in phase with reversal of the direction of the current through winding 20.

A. C. generators 21 and 27 may be of the inductor type and have similar characteristics. Either the output or the input connections are made by way of slip rings, depending upon whether the armature or field is the rotating member. As here illustrated the output connection from generator 21 is by way of slip rings 23. It is known that slip rings and brushes are much more constant in operation than commutators. Since a very small change of current in field 20 may produce a large change of generated voltage in a low impedance circuit, it will be seen that the device provides means for securing high amplification and relatively large power output without a commutator in the amplifying circuit. Constantly excited generator 27 being driven by the same motor which drives generator 21, the frequency of the inputs to motor windings 31 and 33 is the same regardless of the speed of the motor. The required phase displacement between the generator output voltages may be secured by angularly displacing the magnetic axes of the generators, as has been noted. For a two-phase motor this displacement is 90° and with similar generators this displacement may be obtained by relatively positioning the two rotors at this angle on the driving shaft.

In operation, angular displacement of handwheel 10 or other controlling object rotates winding 12 and thereby, through described intermediate means, varies the direct current in winding 20 of alternator 21. This current is zero or a minimum when the axis of winding 12 is perpendicular to that of winding 15, and a maximum when the two axes are parallel. The current in winding 31 of motor 30 being constant and the current in winding 33 being proportional to the current in winding 20, (but of much greater amplitude) motor 30 exerts a torque tending to displace load 40 in proportion to the relative displacement of the axes of windings 12 and 15, and the direction of this torque is reversible with reversal of the phase of the current in winding 30.

Referring now to the arrangement of Fig. 2, handwheel 10 is shown as angularly positioning the single winding 51 of a "selsyn" transmitter 50 having a relatively stationary member mounting three part winding 52, connected by three conductor transmission lines 55 to "selsyn" receiver 57 having a relatively stationary three-part winding 58 and a rotatable single winding 59. Selsyn 57 is operated as a locked or positioned rotor device by virtue of a mechanical repeat-back from the driven object. Such devices are sometimes referred to as "signal generators" or "synchro-transformers." Winding 59 is center-tapped and has the central point thereof connected to the cathode of balanced modulator tube 60 and the outer terminals thereof respectively connected to the two control grids of tube 60.

Biasing means, illustrated as grid battery 62, may be included in the grid-cathode circuit of tube 60 to bias the two sections of the tube to serve as modulators or rectifiers. The anodes or plates of tube 60 are supplied with alternating potential from source 16, by way of a center-tap on field winding 65 of A. C. generator 66. Condensers 67, 67' are bridged across the two halves of the output circuit of tube 60, respectively, to provide low impedance paths for the A. C. components of the tube outputs. The current in coil 65, because of the high inductance of the coil, is substantially continuous.

The output of generator 66 is conducted by way of brushes and slip rings 68 to stator winding 33 of motor 30 as in the arrangement of Fig. 1. A. C. generator 70, corresponding to generator 27 of Fig. 1, may be of the same design as generator 66, no connection being made to the center-tap on its field winding. The load driven by motor 30 by way of gears 72, 73 is shown in Fig. 2, by way of example, as a rotatable platform 75 which may mount an object having substantial inertia, such as a gun or searchlight. A repeat-back connection is shown for rotating "selsyn" winding 59, including pinion 77 meshing with gear 73, and shaft 78 connected by gearing and shafting to shaft 80.

Additional amplification by thermionic means may be provided and it is desirable that suitable rate taking and phase adjustment circuits be included to insure that the system shall be stable and free from hunting tendencies. Such circuits are well known.

In operation, displacement of handwheel 10 induces voltages in the three-part winding 52 of "selsyn" transmitter 50 which are transmitted to synchro-transformer 57 to reproduce the direction of the axis of transmitter winding 51 as a corresponding direction of the resultant field of three-part winding 58 of receiver 57. Winding 59 thereby receives an induced voltage proportional to its angular displacement from the normal to said field direction, said induced voltage being of reversible phase, as described in connection with the operation of transformer 14 of Fig. 1.

Since the plate circuits of tube 60 are supplied with alternating potentials of the same frequency as the input signal, the balanced modulator is rendered phase sensitive, as is known to those skilled in the art, and a continuous current will be supplied to one half or the other of the field winding 65 of A. C. generator 66, dependent upon the phase of the input to tube 60, thus reversibly controlling the current in winding 33 of motor 30.

While the excitation of one phase of induction motor 30 has been described as being substantially constant, this excitation may, within the scope of the invention, be reduced or even eliminated under stand-by conditions to reduce the power then consumed. Such reduction may be made responsive to a factor having a distinctive value at stand-by, such as rotor speed or torque.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. In combination, a motor, a pair of alternating current generators coupled thereto and driven thereby to supply outputs of the same frequency in substantially 90° phase relationships, a two-phase motor having the fields thereof excited by potentials respectively derived from the outputs of said two generators, and thermionic means adapted to receive a reversible phase input and supply a reversible polarity continuous output proportional thereto for reversibly exciting at least one of said generators to control the magnitude and direction of the torque exerted by said two-phase motor.

2. In a servo system, substantially constant speed driving means, a pair of alternating current generators driven thereby at the same speed, means constantly exciting one of said generators, means furnishing a reversible phase alternating potential measuring the angular position of a displaceable member, phase sensitive means for converting said alternating potential into a reversible polarity continuous potential, circuit means utilizing a version of said last potential to excite the other of said generators and a two-phase motor having the phases thereof excited by potentials respectively derived from the outputs of said generators.

3. A positional control system comprising a controlling object, a controlled object, a two-phase induction motor driving the controlled object, means constantly exciting one field of said motor and variably exciting the other field, both at the same frequency, including a motor, a pair of alternating current generators synchronously driven thereby in out of phase relationship, each of said generators supplying current to one phase of said motor and means for varying the relative excitation of said generators in proportion to the positional disagreement of the controlling and controlled object, and a repeat-back connection from the controlled object to said last means.

4. In a positional control system controlling and controlled objects, a two-phase induction motor driving the controlled object, means for supplying current of the same frequency to the fields of said motor in different time phase relationship comprising a motor, a pair of angularly spaced generators synchronously driven thereby and respectively connected to supply current to said motor fields, a source of direct current, one of said generators being constantly excited from said source to supply substantially constant amplitude current to one phase of said two-phase motor, means providing variable excitation for the other of said generators in proportion to the positional disagreement of said controlling and controlled objects, and repeat-back means from the controlled object to said variable excitation means.

5. In a positional control system of the Ward-Leonard type, having controlling and controlled objects, a two-phase induction motor for driving the latter, a pair of continuously driven A. C. generators for supplying two alternating currents to said motor at substantially 90° out of phase, one of which is variable in magnitude and reversible in phase for driving said controlled object at variable speed in either direction, means producing an A. C. signal proportional in magnitude and reversible in phase with the amount and direction of relative displacement of said objects, and a phase sensitive rectifier connected thereto for supplying D. C. to the field of one of said generators which varies in magnitude and direction with the magnitude and phase sense of the signal, whereby the variable field of said motor varies from zero in either of two opposite phases to drive said motor in a direction and speed to maintain synchronism.

GERARD DE WESTFELT.